(12) United States Patent
Noé

(10) Patent No.: US 10,209,891 B2
(45) Date of Patent: Feb. 19, 2019

(54) METHODS AND SYSTEMS FOR IMPROVING FLASH MEMORY FLUSHING

(71) Applicant: HGST Netherlands B.V., Amsterdam (NL)

(72) Inventor: Daniel Peter Noé, Littleton, MA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 320 days.

(21) Appl. No.: 14/833,817

(22) Filed: Aug. 24, 2015

(65) Prior Publication Data

US 2017/0060433 A1 Mar. 2, 2017

(51) Int. Cl.
| | | |
|---|---|---|
| *G06F 12/00* | (2006.01) | |
| *G06F 3/06* | (2006.01) | |
| *G06F 12/02* | (2006.01) | |
| *G06F 12/0868* | (2016.01) | |
| *G06F 12/0871* | (2016.01) | |

(Continued)

(52) U.S. Cl.
CPC ........ *G06F 3/0608* (2013.01); *G06F 3/0652* (2013.01); *G06F 3/0679* (2013.01); *G06F 12/0246* (2013.01); *G06F 12/0868* (2013.01); *G06F 12/0871* (2013.01); *G06F 12/121* (2013.01); *G06F 12/0804* (2013.01); *G06F 2212/1016* (2013.01); *G06F 2212/1044* (2013.01); *G06F 2212/222* (2013.01); *G06F 2212/7205* (2013.01)

(58) Field of Classification Search
CPC .... G06F 3/0608; G06F 3/0652; G06F 3/0679; G06F 12/0246; G06F 2212/7205; G06F 2212/1044
See application file for complete search history.

(56) References Cited

U.S. PATENT DOCUMENTS

| | | | |
|---|---|---|---|
| 5,341,339 A | 8/1994 | Wells | |
| 6,275,912 B1 * | 8/2001 | Haba | G06F 3/0613 709/213 |

(Continued)

FOREIGN PATENT DOCUMENTS

| | | |
|---|---|---|
| EP | 2423853 A2 | 2/2012 |
| JP | H 06-223591 A | 8/1994 |

(Continued)

OTHER PUBLICATIONS

Friedman, Scott, et al. "Dusty caches for reference counting garbage collection." ACM SIGARCH Computer Architecture News. vol. 34. No. 1. IEEE Computer Society, 2005.*

(Continued)

*Primary Examiner* — Francisco A Grullon
(74) *Attorney, Agent, or Firm* — Morgan, Lewis & Bockius LLP (57) ABSTRACT

Techniques for improving flash memory flushing are disclosed. In some embodiments, the techniques may be realized as a method for improving flash memory flushing including receiving a request to write to flash memory, writing data associated with the request to the flash memory, identifying a pointer to a region bitmap corresponding to a write region for the write request, marking a bit of the region bitmap corresponding to the request as dirty, and updating the pointer, using a pointer management component, to the region bitmap to contain a dirty block count.

18 Claims, 7 Drawing Sheets

(51) Int. Cl.
*G06F 12/121* (2016.01)
*G06F 12/0804* (2016.01)

(56) References Cited

U.S. PATENT DOCUMENTS

| | | | | |
|---|---|---|---|---|
| 6,490,657 | B1* | 12/2002 | Masubuchi | G06F 11/2041 711/135 |
| 7,606,841 | B1* | 10/2009 | Ranade | G06F 17/30575 707/615 |
| 8,825,937 | B2* | 9/2014 | Atkisson | G06F 12/0246 711/102 |
| 8,838,936 | B1* | 9/2014 | Salessi | G06F 12/0246 711/207 |
| 8,903,888 | B1* | 12/2014 | Hyser | G06F 9/45558 709/202 |
| 2003/0097523 | A1* | 5/2003 | Nobuyoshi | G06F 3/0601 711/112 |
| 2005/0278486 | A1* | 12/2005 | Trika | G06F 12/0866 711/142 |
| 2007/0124531 | A1* | 5/2007 | Nishihara | G06F 12/0246 711/3 |
| 2008/0005192 | A1* | 1/2008 | Jung | G06F 11/1441 |
| 2009/0249001 | A1* | 10/2009 | Narayanan | G06F 1/3203 711/161 |
| 2010/0228913 | A1* | 9/2010 | Czezatke | G06F 11/1451 711/112 |
| 2011/0314229 | A1* | 12/2011 | Miller | G06F 11/1435 711/154 |
| 2012/0198174 | A1* | 8/2012 | Nellans | G06F 12/0804 711/133 |
| 2012/0221774 | A1* | 8/2012 | Atkisson | G06F 12/0802 711/103 |
| 2014/0195480 | A1* | 7/2014 | Talagala | G06F 12/0804 707/610 |
| 2015/0309933 | A1* | 10/2015 | Nellans | G06F 12/0804 711/103 |

FOREIGN PATENT DOCUMENTS

| | | |
|---|---|---|
| JP | H 10-083351 A | 3/1998 |
| JP | 2007-334852 A | 12/2007 |
| WO | WO-02/46930 A2 | 6/2002 |

OTHER PUBLICATIONS

Lee, Changman, et al. "F2FS: A New File System for Flash Storage." Fast. 2015.*

Qiu, Sheng, and Al Narasimha Reddy. "Nvmfs: A hybrid file system for improving random write in nand-flash ssd." Mass Storage Systems and Technologies (MSST), 2013 IEEE 29th Symposium on. IEEE, 2013.*

UK Search report dated Feb. 13, 2017, which issued in Application No. GB1614433.9.

Japanese Office Action from Japanese Patent Application No. 2016-164115, dated Jan. 9, 2018, 9 pages.

Korean Office Action from Korean Patent Application No. 10-2016-0107925, dated Sep. 18, 2017, 7 pages.

Korean Office Action from Korean Patent Application No. 10-2016-0107925, dated Apr. 17, 2018, 7 pages.

Korean Office Action from Korean Patent Application No. 10-2016-0107925, dated Aug. 17, 2018, with English language summary (4 pages).

Japanese Office Action from Japanese Patent Application No. 2016-164115, dated Sep. 7, 2018, with machine-generated English language translation (12 pages).

* cited by examiner

METHODS AND SYSTEMS FOR IMPROVING FLASH MEMORY FLUSHING

BACKGROUND

To obtain the best possible performance when writing from a Solid State Device (SSD) to a conventional storage device (e.g., a hard drive) writes may be sequentially ordered according to their Logical Block Address (LBA). The longer a continuous run of addresses is during a write operation the better the performance may be. However, the length of a run of addresses that require writing from an SSD to conventional storage may depend upon which portions of SSD storage have modifications that have not yet been committed to conventional storage (e.g., dirty blocks). Tracking such dirty blocks in an SSD (e.g., comprising flash memory) to identify blocks requiring writes to storage (e.g., flushing) in an efficient manner is challenging.

SUMMARY

Techniques for improving flash memory flushing are disclosed. In some embodiments, the techniques may be realized as a method for improving flash memory flushing including receiving a request to write to flash memory, writing data associated with the request to the flash memory, identifying a pointer to a region bitmap corresponding to a write region for the request, marking a bit of the region bitmap corresponding to the request as dirty, and updating the pointer, using a pointer management component, to the region bitmap to contain a dirty block count.

In accordance with additional aspects of this embodiment, updating the pointer to the region bitmap to contain a dirty block count may include updating one or more higher order bits of the pointer to contain the dirty block count.

In accordance with further aspects of this embodiment, the pointer may include a pointer with 48 significant lower bits and 16 higher order bits and wherein the dirty block count is stored in the 16 higher order bits.

In accordance with other aspects of this embodiment, marking a bit of the region bitmap corresponding to the request as dirty may include updating the higher order bits of the pointer to contain a value of a last significant bit of the pointer, and using the updated pointer to identify the region bitmap.

In accordance with additional aspects of this embodiment, the pointer may include one of an array of pointers and wherein the array of pointers is ordered by a dirty block count in each of the pointers.

In accordance with further aspects of this embodiment, the techniques may include identifying a dirtiest region of a plurality of regions of the flash memory using the ordered array of pointers, and writing one or more blocks of the dirtiest region to conventional storage.

In accordance with other aspects of this embodiment, writing one or more blocks to conventional storage may be triggered by detection of one or more factors.

In accordance with additional aspects of this embodiment, the one or more factors may include at least one of: a specified threshold of dirty blocks attained, a level of CPU utilization, a level of network utilization, a level of convention storage input/output, an aging out of one or more blocks from cache, and a user specified preference.

In accordance with further aspects of this embodiment, writing one or more blocks of the dirtiest region to conventional storage may include using a base address of a region bitmap and an offset associated with a bit of the region bitmap to identify a logical block address associated with data to be written to conventional storage.

In accordance with additional aspects of this embodiment, the techniques may include after writing one or more blocks associated with a first region, identifying a second pointer in the array of pointers associated with a second dirtiest region.

In accordance with further aspects of this embodiment, when one or more blocks associated with a first pointer are written to conventional storage, and an offset of the second pointer becomes a starting point of the array.

In other embodiments, the techniques may be realized as a non-transitory computer program product including of a series of instructions executable on a computer. The non-transitory computer program product may perform a process for improving flash memory flushing. The computer program may implement the steps of receiving a request to write to flash memory, writing the data associated with the request to the flash memory, identifying a pointer to a region bitmap corresponding to a write region for the request, marking a bit of the region bitmap corresponding to the request as dirty, and updating the pointer to the region bitmap to contain a dirty block count.

In yet other embodiments, the techniques may be realized as a system for improving flash memory flushing. The system may include a storage media device and a PCIe-based device controller associated with the storage media device. The PCIe-based device controller may be configured to receive a request to write to flash memory, write the request to the flash memory, identify a pointer to a region bitmap corresponding to a write region for the request, mark a bit of the region bitmap corresponding to the request as dirty, and update the pointer to the region bitmap to contain a dirty block count.

In accordance with additional aspects of this embodiment, updating the pointer to the region bitmap to contain a dirty block count may include updating one or more higher order bits of the pointer to contain the dirty block count.

In accordance with further aspects of this embodiment, the pointer may include a pointer with 48 significant lower bits and 16 higher order bits and wherein the dirty block count is stored in the 16 higher order bits.

In accordance with other aspects of this embodiment, marking a bit of the region bitmap corresponding to the request as dirty may include updating the higher order bits of the pointer to contain a value of a last significant bit of the pointer, and using the updated pointer to identify the region bitmap.

In accordance with additional aspects of this embodiment, the pointer may include one of an array of pointers and wherein the array of pointers is ordered by a dirty block count in each of the pointers.

In accordance with further aspects of this embodiment, the PCIe-based device controller may be further configured to identify a dirtiest region of a plurality of regions of the flash memory using the ordered array of pointers, and write one or more blocks of the dirtiest region to conventional storage.

In accordance with other aspects of this embodiment, writing one or more blocks to conventional storage may be triggered by detection of one or more factors.

In accordance with additional aspects of this embodiment, the one or more factors may include at least one of: a specified threshold of dirty blocks attained, a level of CPU utilization, a level of network utilization, a level of convention storage input/output, an aging out of one or more blocks from cache, and a user specified preference.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure relates to techniques for improving flushing of modified data from SSDs (e.g., comprising flash memory) to conventional storage (e.g., Disk, Tape, etc.). According to some embodiments, when presented with a set of data which was written in a random order, the writes are stored first into Random Access friendly Solid State storage. Data structures, algorithms, and/or circuitry (e.g., (micro) processor, logic gates, switches, an application specific integrated circuit (ASIC), a programmable logic controller (e.g., FPGA), and an embedded microcontroller) may be provided that allow these writes to be written back to conventional storage in an ordered manner with an improved likelihood of continuous runs of Logical Block Addresses.

Figure 1:
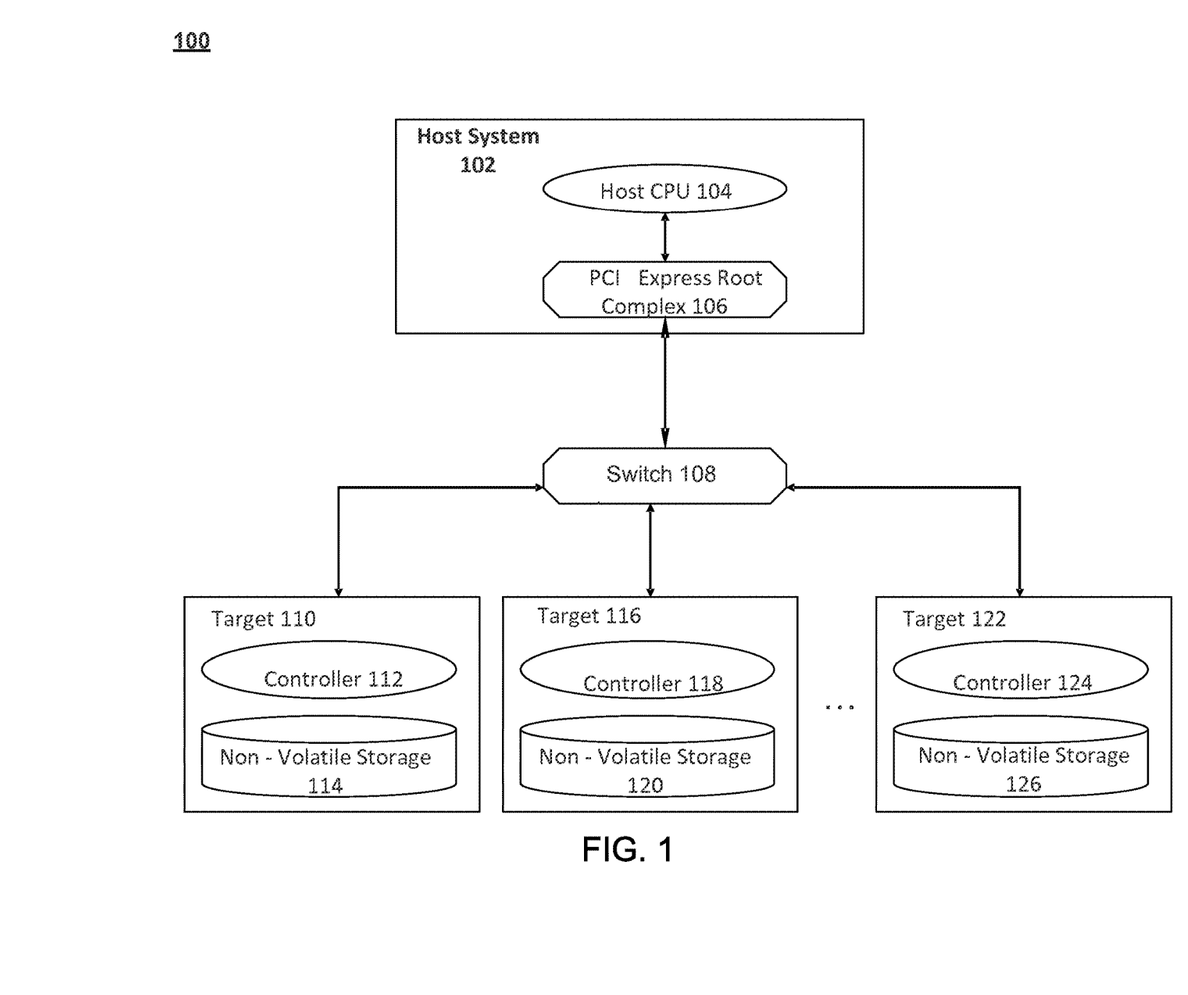
FIG. 1 is a block diagram depicting a plurality of PCIe devices in communication with a host device, in accordance with an embodiment of the present disclosure.

Turning now to the drawings, FIG. 1 is a block diagram 100 depicting a PCIe device in communication with a host device, in accordance with an embodiment of the present disclosure. FIG. 1 includes a number of computing technologies such as a host system 102, host CPU 104, and PCI express root complex 106. Switch 108 may communicatively couple a plurality of targets (e.g., PCIe devices, such as NVMe based targets) such as Targets 110, 116 and 122 to host system 102 via PCI express root complex 106.

Target 110 may contain controller 112 (e.g., NVMe controller) and non-volatile storage 114. Target 116 may contain controller 118 (e.g., NVMe controller) and non-volatile storage 120. Target 122 may contain controller 124 (e.g., NVMe controller) and non-volatile storage 126.

Memory based resources may be accessible to Host System 102 via a memory interface (e.g., double data rate type three synchronous dynamic random access memory (DDR3 SDRAM)). Memory can take any suitable form, such as, but not limited to, a solid-state memory (e.g., flash memory, or solid state device (SSD)), optical memory, and magnetic memory.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller (e.g., FPGA), and an embedded microcontroller, for example.

Figure 2A:
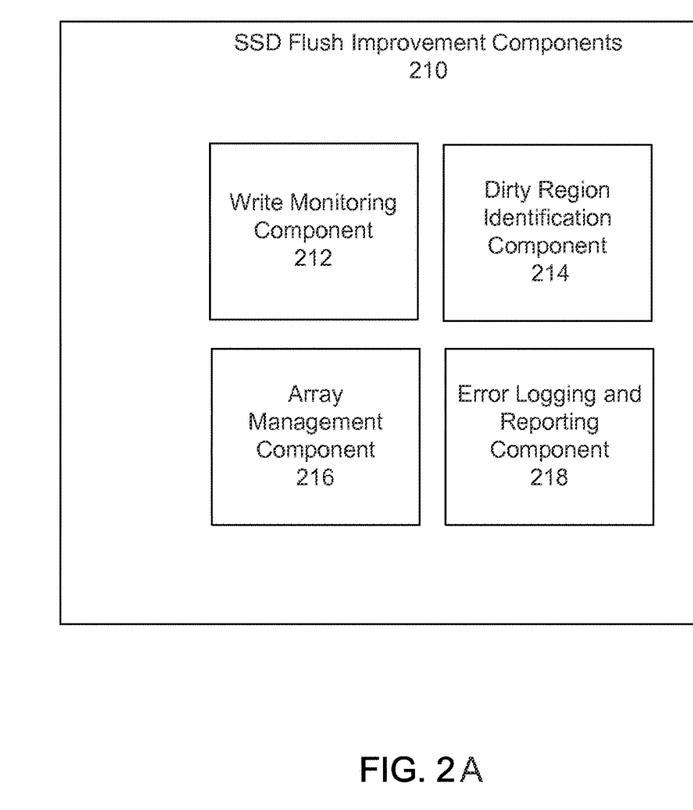
FIG. 2A is a block diagram depicting a module for improving flash memory flushing, in accordance with an embodiment of the present disclosure.

FIG. 2A depicts a module for improving flash memory flushing, in accordance with an embodiment of the present disclosure. Components may be hardware (e.g., dedicated circuitry), firmware, software, or a combination of the foregoing.

The description below describes network elements, computers, and/or components of a system and method for backup and restoration that may include one or more components. As used herein, the term "component" may be understood to refer to computing software, firmware, hardware, and/or various combinations thereof. Components, however, are not to be interpreted as software which is not implemented on hardware, firmware, or recorded on a processor readable recordable storage medium (i.e., components are not software per se). It is noted that the components are exemplary. The components may be combined, integrated, separated, and/or duplicated to support various applications. Also, a function described herein as being performed at a particular component may be performed at one or more other components and/or by one or more other devices instead of or in addition to the function performed at the particular component. Further, the components may be implemented across multiple devices and/or other components local or remote to one another. Additionally, the components may be moved from one device and added to another device, and/or may be included in both devices. In some embodiments, one or more components may be implemented as part of SSD Controller, a host system, and/or SSD optimization software. As illustrated in FIG. 2A, SSD flush improvement components 210 may contain write monitoring component 212, dirty region identification component 214, array management component 216, and error logging and reporting component 218.

Write monitoring component 212 may track data written to an SSD (e.g., flash memory) which has not yet been written to conventional storage (e.g., dirty memory). Going through each block or other unit of storage to compare it with backing storage (e.g., disk) to identify changed blocks may be resource intensive and/or time consuming. In some embodiments, when a portion of SSD storage is modified write monitoring component 212 may track the write using one or more data structures and/or circuitry. For example, in some embodiments, write monitoring component 212 may use a bitmap to store blocks to be written for each region. Conventional backing storage devices may be divided into fixed sized regions. For example, each region may contain 32768 blocks, each block may be four kilobytes in size.

Figure 2B:
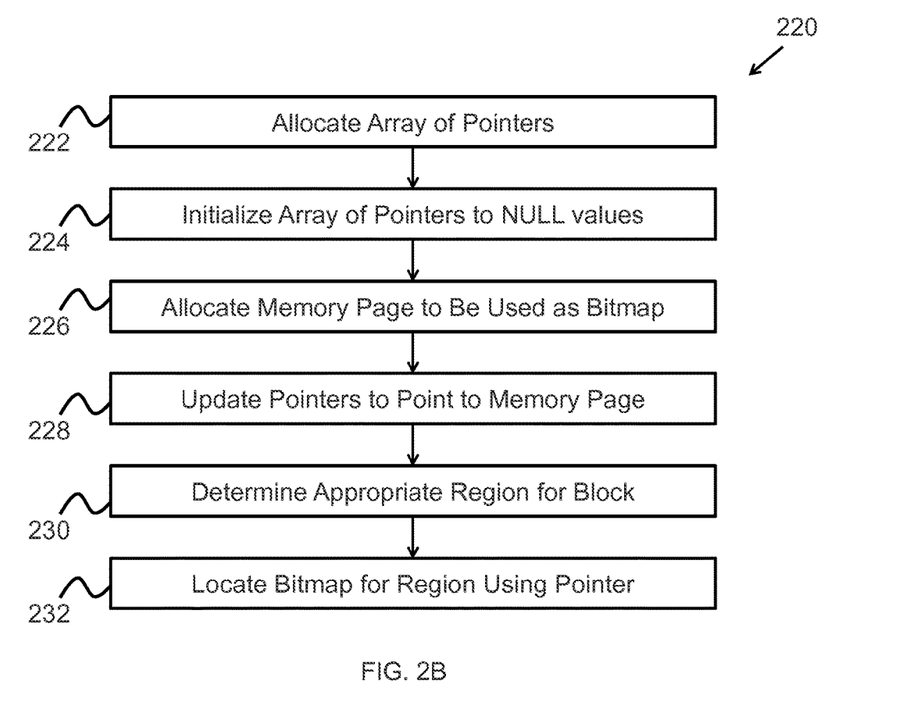
FIG. 2B depicts a flowchart illustrating a method for using a bitmap to store blocks to written, in accordance with an embodiment of the present disclosure.

FIG. 2B depicts a flowchart illustrating an exemplary method 220 for using a bitmap to store blocks to written. According to some embodiments, when a system starts, array management component 216 may allocate an array of pointers 222, one for each region, and may initialize the array to NULL values 224. When a region is first written to, a four kilobyte page of memory may be allocated 226 and a pointer for that region may be updated to point to the newly allocated memory page 228.

In one example, a four kilobyte memory page contains 32768 individual bits of memory. This memory may be used as a bit map. When a block is initially written to temporary random access storage, its logical block address may first be masked and shifted to determine the appropriate region 230. Then, after allocation, a pointer may be utilized by write monitoring component 212 to locate the bitmap for a region 232. For example, once an SSD storage location is allocated, it may be associated with a pointer, value, or reference that indicates a location of a bitmap, hashmap or other data structure storing indications of which bits in SSD storage have not yet been written to conventional storage. The low order bits (e.g., significant lower bits) of the logical block address for a block written to temporary random access storage may then be used as an offset into the bitmap to locate a corresponding bit. In some embodiments, this may require no searching and only constant time operations (i.e., a time taken to complete the operations may be independent of a size of the input) to mark a block as "dirty" (e.g., requiring a future write back to conventional storage).

Dirty region identification component 214 may determine when to flush dirty portions of an SSD to conventional storage and/or which portions should be flushed in which order. In some embodiments, it may be desirable to have long sequential runs of writes to conventional storage. To achieve this, writes to conventional storage may be performed once one or more regions of an SSD are sufficiently dirty (e.g., contain a significant number of sequential dirty blocks). Determination of when one or more regions is sufficiently dirty may be dependent upon one or more factors and may be configurable (e.g., a number, percentage or other indicator of an amount of dirty blocks in a region). To improve a likelihood that a region is sufficiently dirty for flushing, dirty region identification component 214 may identify a dirtiest region to write first.

Figure 2C:
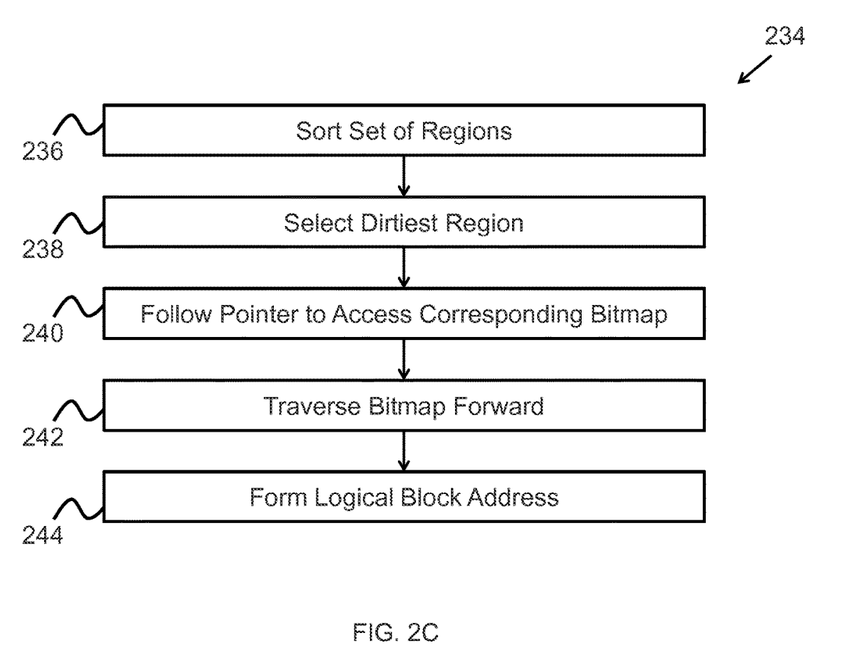
FIG. 2C depicts a flowchart illustrating a method for writing back a dirtiest region first, in accordance with an embodiment of the present disclosure.

FIG. 2C depicts a flowchart illustrating an exemplary method 234 for writing back dirtiest region first, in accordance with an embodiment of the present disclosure. When it is time to write data back to conventional storage, the set of regions is sorted 236 and the dirtiest (most populated with data that needs writing) region is selected 238 by dirty region identification component 214. According to some embodiments, array management component 216 may sort the regions.

The pointer for that region may be followed to access the corresponding bitmap 240. The bitmap may then be traversed forward 242. The base logical block address of the region may be combined with the offset of each bit in the map to form the logical block address that requires writing back 244.

Sorting regions may traditionally require counting all of the bits that are set within each bitmap to identify a dirtiest region. This may be prohibitive as it may use a large CPU intensive scan of the bitmap to determine the number of bits set. In some embodiments, write monitoring component 212 may use space within a pointer to the region's dirty bitmap to indicate a count of portions of dirty storage within a region (e.g., a number of bits set within a four kilobyte bitmap block). For example, in x86_64 architecture only 48 bits out of a 64 bit pointer may be significant. The high order bits may be sign extended from the 48 low order bits, e.g., significant lower bits. This means that the bits may be the same for the top 16 bits, and, if lost, this value can be obtained from bit 47. In some embodiments, write monitoring component 212 may store the count of bits set in the bitmap block within the high order 16 bits of the pointer in an array of pointers. Array management component 216 may use a bit count in each pointer of an array or other data structure of pointers (or other reference structures) to sort an array such that a first pointer is the dirtiest.

Figure 2D:
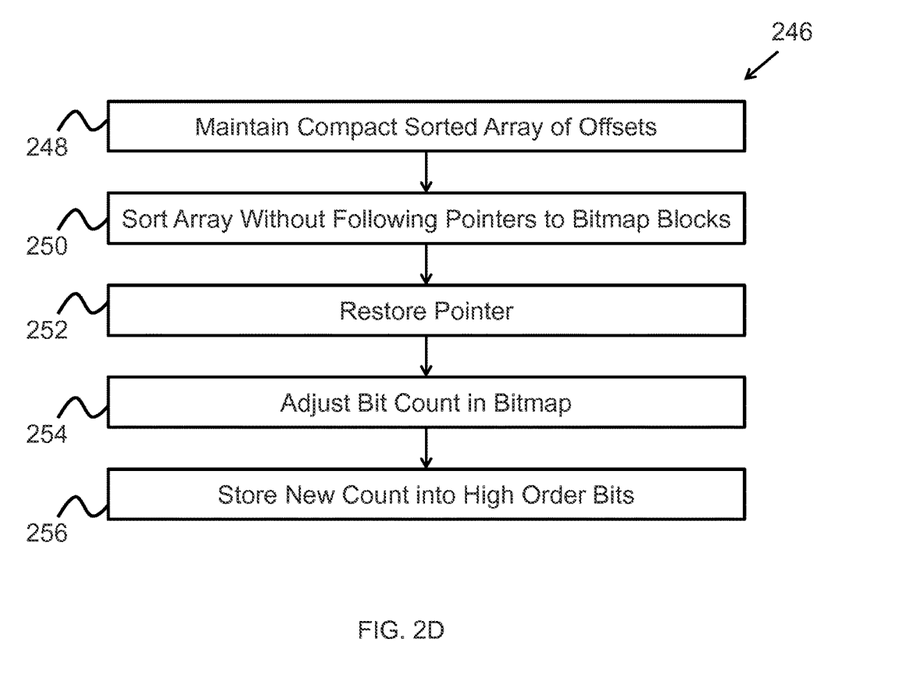
FIG. 2D depicts a flowchart illustrating a method for sorting regions, in accordance with an embodiment of the present disclosure.

FIG. 2D depicts a flowchart illustrating an exemplary method 246 for sorting regions, in accordance with an embodiment of the present disclosure. Array management component 216 may maintain a compact sorted array of four byte offsets 248 into the main pointer array that contains one pointer per region. When it is time to perform some writes back to conventional storage the array can be sorted without following the pointers to the bitmap blocks at all 250. This may substantially decrease the overhead of finding the dirtiest region to write back.

To follow a pointer that has been modified to store a dirty bit count, the pointer may be restored 252. In some embodiments, the pointer may be restored by sign extending a last significant bit into the higher order bits (e.g., copying the value from bit 47 to bits 48-63). When the count of bits set in the bitmap is adjusted 254 the new count may be stored into the high order bits 256.

In some embodiments, dirty region identification component 214 may rank a plurality of regions and one or more additional factors may be evaluated in addition to a number, percentage or other indicator of an amount of dirty blocks in a region. For example, an age of data in an SSD region may be considered. Other factors may include algorithms such as Last In First Out (LIFO), First in First Out (FIFO) or other techniques for determining which region should be written. For example, if a first region is dirtier than a second region, but the first region is still receiving significant Input/Output (I/O) traffic, a second region may be written first in some embodiments.

Array management component 216 may maintain an array or other data structure containing references to bitmaps indicating dirty SSD regions. Certain sorting algorithms may perform better when an array is already substantially sorted. One or more embodiments described above may sort a set of regions, take a dirtiest region, and completely clean it, and leave the remainder of the array in a sorted state. This may work well for flushing dirty regions to conventional storage because it may allow dirty region identification component to move on to the next dirtiest region (which may even be equally dirty). However, a substantially sorted array with one mis-sorted block at the beginning may exhibit pathological behavior and may require many CPU operations to move to the new proper position at the end of the array.

To address this, array management component 216 may handle the sorted array as a circular array where the beginning and end are movable. Initially the sorted start of an array may be at offset 0, and the end may be the last element of the block of memory containing the array. Once the highest ranking region is cleaned it may still be present at offset 0, but it may be sorted incorrectly. Instead of re-sorting the array conventionally and moving the data, array management component 216 may adjust the sorted start and end offsets so that the entire circular array is shifted by one. The sorted start offset may become 1, and the 0th element of the array may now be the last element of the array. In this way the region that has been reduced to 0 dirty blocks is re-sorted to the proper position at the end of the array in a constant time operation leaving the array otherwise sorted.

Error logging and reporting component 218 may trap errors and log errors associated with monitoring of write requests, identification of dirty regions, and/or management of data structures tracking dirty regions (e.g., arrays of pointers). In some embodiments, error logging and reporting component 218 may provide notifications of errors.

Figure 3:
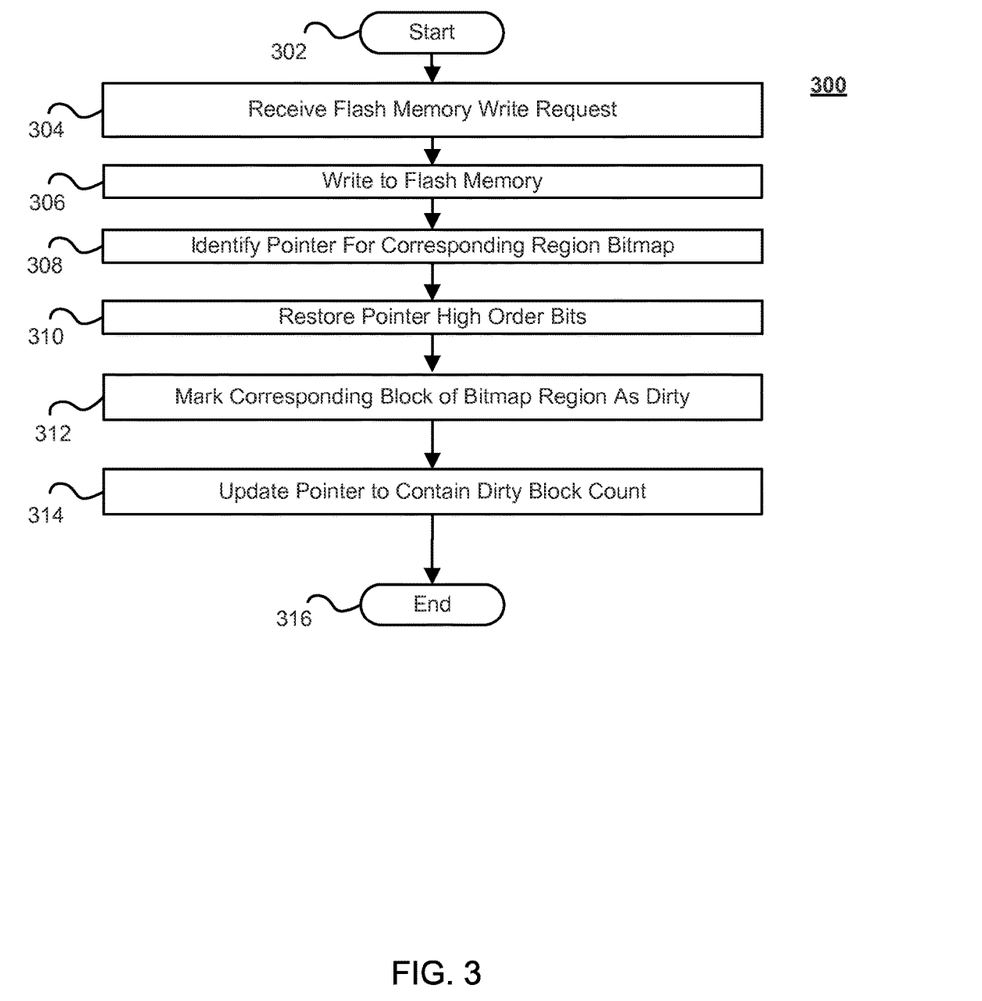
FIG. 3 depicts a flowchart illustrating a method for improving flash memory flushing, in accordance with an embodiment of the present disclosure.

FIG. 3 depicts a flowchart illustrating a method for improving flash memory flushing, in accordance with an embodiment of the present disclosure. The process 300, however, is exemplary only. The process 300 can be altered, e.g., by having stages added, changed, removed, or rearranged. At stage 302, the process may begin.

At stage 304, a flash memory write request may be received. At stage 306 the write request may be written to a flash memory region. For a plurality of regions of an SSD an array of pointers may be allocated, one for each region, and each array may be initialized to NULL values.

At stage 308, when a region is first written to a page of memory may be allocated and a pointer for that region may be updated to point to the newly allocated memory page.

At stage 310, if a pointer has previously been allocated and higher order bits of the pointer have been written over to store a count of dirty blocks, the higher order bits may be restored. For example, in x86_64 architecture only 48 bits out of a 64 bit pointer may be significant. The high order bits may be sign extended from the 48 low order bits, e.g., significant lower bits. This means that the bits may be the same for the top 16 bits, and if lost this value can be obtained from bit 47.

At stage 312, after allocation, a pointer may be utilized to find the bitmap for a region. The low order bits of the logical block address for a block written to temporary random access storage may then be used as an offset into the bitmap to locate a corresponding bit. In some embodiments, this may require no searching and only constant time operations to mark a block as "dirty" (e.g., requiring a future write back to conventional storage).

At stage 314, space within a pointer to the region's dirty bitmap may be used to indicate a count of portions of dirty storage within a region (e.g., a number of bits set within a four kilobyte bitmap block). For example, in x86_64 architecture only 48 bits out of a 64 bit pointer may be significant. The high order bits may be sign extended from the 48 low order bits, e.g., significant lower bits. This means that the bits may be the same for the top 16 bits, and if lost this value can be obtained from bit 47. In some embodiments, the count of bits set in the bitmap block may be stored within the high order 16 bits of the pointer in an array of pointers.

At stage 316, the method 300 may end.

Figure 4:
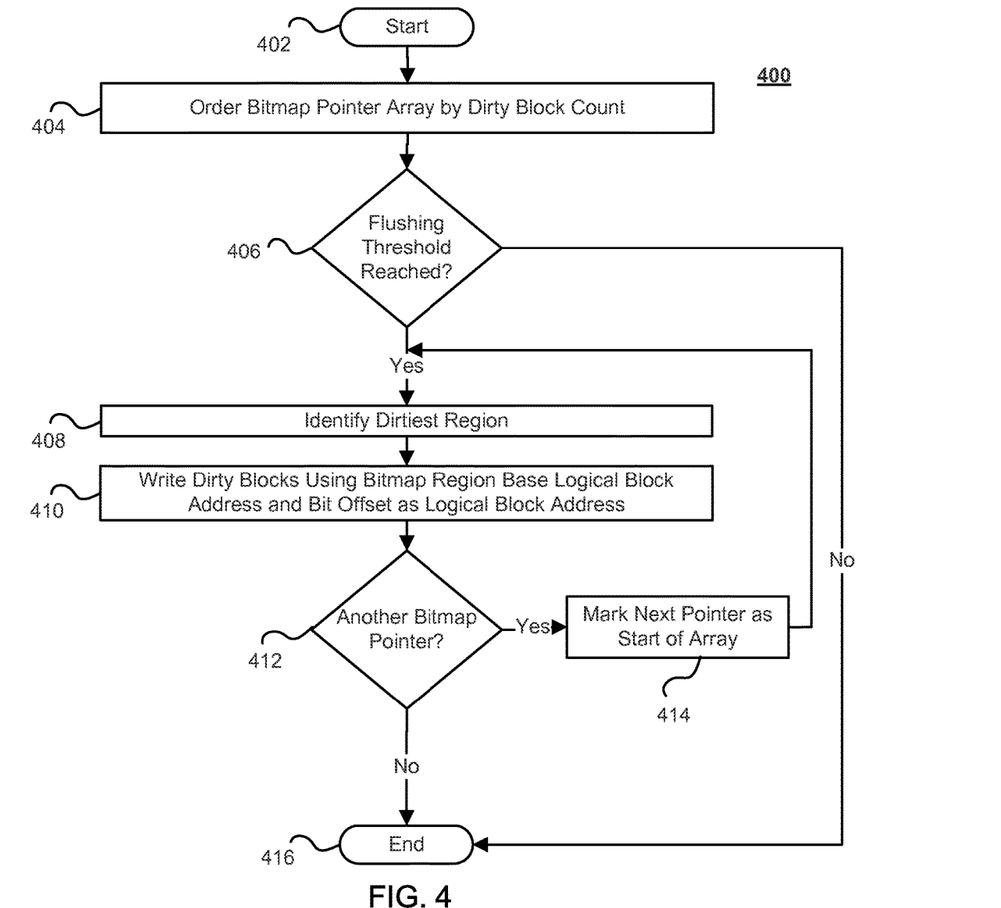
FIG. 4 depicts a flowchart illustrating a method for improving flash memory flushing, in accordance with an embodiment of the present disclosure.

FIG. 4 depicts a flowchart illustrating a method for improving flash memory flushing, in accordance with an embodiment of the present disclosure.

The process 400, however, is exemplary only. The process 400 can be altered, e.g., by having stages added, changed, removed, or rearranged. At stage 402, the process may begin.

At stage 404, an array of pointers to dirty region bitmaps may be sorted. A bit count in each pointer of an array or other data structure of pointers (or other reference structures) may be used to sort an array such that a first pointer is the dirtiest.

At stage 406, it may be determined whether a flushing threshold has been reached. One or more factors may be evaluated to determine whether dirty SSD storage should be flushed to conventional storage. For example, factors may include one or more of a specified threshold of dirty blocks attained, a level of CPU utilization, a level of network utilization, a level of convention storage input/output, an aging out of one or more blocks from cache, and a user specified preference. If it is determined that flushing should be performed, the method may continue at stage 408. If it is determined that flushing should not be performed, the method may end at stage 416.

At stage 408, a dirtiest region may be identified. In some embodiments, space within a pointer to the region's dirty bitmap may indicate a count of portions of dirty storage within a region (e.g., a number of bits set within a four kilobyte bitmap block). For example, in x86_64 architecture only 48 bits out of a 64 bit pointer may be significant. The high order bits may be sign extended from the 48 low order bits, e.g., significant lower bits. This means that the bits may be the same for the top 16 bits, and if lost this value can be obtained from bit 47. An array of pointers to dirty regions may use a bit count in each pointer of an array or other data structure of pointers (or other reference structures) to sort an array such that a first pointer is the dirtiest.

At stage 410, dirty blocks associated with a most dirty region may be written to conventional storage (e.g., disk, tape, etc.). In some embodiments, dirty blocks may be identified from a dirty block bitmap using a base logical block address of a dirty region bitmap and an offset corresponding to a particular dirty bit to provide a logical block address for a dirty block corresponding to the dirty bit.

At stage 412 it may be determined whether another bitmap pointer exists in an array of pointers to dirty region bitmaps. If no other pointers exist (e.g., all dirty bitmaps meeting or exceeding a flushing threshold have been flushed to disk and sorted in an array), the method 400 may end at stage 416. If another bitmap pointer for a dirty region exists, the method 400 may continue at stage 414.

At stage 414, a pointer corresponding to a next dirtiest bitmap may be marked as a start of the array. Initially the sorted start of an array may be at offset 0, and the end may be the last element of the block of memory containing the array. Once the highest ranking region is cleaned (e.g., after stage 408) the region pointer may still be present at offset 0, but it may be sorted incorrectly. Instead of re-sorting the array conventionally and moving the data, method 400 may adjust the sorted start and end offsets so that the entire circular array is shifted by one. The sorted start offset may become 1, and the 0th element of the array may now be the last element of the array. In this way the region that has been reduced to 0 dirty blocks is re-sorted to the proper position at the end of the array in a constant time operation leaving the array otherwise sorted. After an array start element has been adjusted, the method 400 may return to stage 406.

At stage 416, the method 400 may end

Other embodiments are within the scope and spirit of the invention. For example, the functionality described above can be implemented using software, hardware, firmware, hardwiring, or combinations of any of these. One or more computer processors operating in accordance with instructions may implement the functions associated with for improving flash memory flushing in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for improving flash memory flushing comprising:
   receiving a request to write to flash memory;
   writing data associated with the request to the flash memory;
   identifying a pointer to a region bitmap corresponding to a write region for the request;
   marking a bit of the region bitmap corresponding to the request as dirty; and
   updating the pointer, using a pointer management component, to the region bitmap to contain a dirty block count, wherein updating the pointer to the region bitmap to contain the dirty block count comprises updating one or more higher order bits of the pointer to contain the dirty block count.

2. The method of claim 1, wherein the pointer comprises a pointer with 48 significant lower bits and 16 higher order bits and wherein the dirty block count is stored in the 16 higher order bits.

3. The method of claim 1, wherein marking a bit of the region bitmap corresponding to the request as dirty comprises updating the higher order bits of the pointer to contain a value of a last significant bit of the pointer, and using the updated pointer to identify the region bitmap.

4. The method of claim 1, wherein the pointer comprises one of an array of pointers and wherein the array of pointers is ordered by a dirty block count in each of the pointers.

5. The method of claim 4, further comprising:
   identifying a dirtiest region of a plurality of regions of the flash memory using the ordered array of pointers; and
   writing one or more blocks of the dirtiest region to conventional storage.

6. The method of claim 5, wherein writing one or more blocks to conventional storage is triggered by detection of one or more factors.

7. The method of claim 6, wherein the one or more factors comprise at least one of: a specified threshold of dirty blocks attained, a level of CPU utilization, a level of network utilization, a level of convention storage input/output, an aging out of one or more blocks from cache, and a user specified preference.

8. The method of claim 5, wherein writing one or more blocks of the dirtiest region to conventional storage comprises using a base address of a region bitmap and an offset associated with a bit of the region bitmap to identify a logical block address associated with data to be written to conventional storage.

9. The method of claim 5 further comprising after writing one or more blocks associated with a first region, identifying a second pointer in the array of pointers associated with a second dirtiest region.

10. The method of claim 9, wherein when one or more blocks associated with a first pointer are written to conventional storage, and an offset of the second pointer becomes a starting point of the array.

11. A non-transitory machine-readable medium comprised of a series of instructions executable on a machine, that when executed by a processor, perform a method for performing flash memory flushing comprising:
   receiving a request to write to flash memory;
   writing data associated with the request to the flash memory;
   identifying a pointer to a region bitmap corresponding to a write region for the request;
   marking a bit of the region bitmap corresponding to the request as dirty; and
   updating the pointer to the region bitmap to contain a dirty block count, wherein updating the pointer to the region bitmap to contain the dirty block count comprises updating one or more higher order bits of the pointer to contain the dirty block count.

12. A system for improving flash memory flushing, the system comprising:
   a storage media device;
   a PCIe-based device controller associated with the storage media device, wherein the PCIe-based device controller is configured to:
      receive a request to write to flash memory;
      write data associated with the request to the flash memory;
      identify a pointer to a region bitmap corresponding to a write region for the request;
      mark a bit of the region bitmap corresponding to the request as dirty; and
      update one or more higher order bits of the pointer to the region bitmap to contain a dirty block count.

13. The system of claim 12, wherein the pointer comprises a pointer with 48 significant lower bits and 16 higher order bits and wherein the dirty block count is stored in the 16 higher order bits.

14. The system of claim 12, wherein marking a bit of the region bitmap corresponding to the request as dirty comprises updating the higher order bits of the pointer to contain a value of a last significant bit of the pointer, and using the updated pointer to identify the region bitmap.

15. The system of claim 12, wherein the pointer comprises one of an array of pointers and wherein the array of pointers is ordered by a dirty block count in each of the pointers.

16. The system of claim 15, wherein the PCIe-based device controller is further configured to:
   identify a dirtiest region of a plurality of regions of the flash memory using the ordered array of pointers; and
   write one or more blocks of the dirtiest region to conventional storage.

17. The system of claim 16, wherein writing one or more blocks to conventional storage is triggered by detection of one or more factors.

18. The system of claim 17, wherein the one or more factors comprise at least one of: a specified threshold of dirty blocks attained, a level of CPU utilization, a level of network utilization, a level of convention storage input/output, an aging out of one or more blocks from cache, and a user specified preference.

* * * * *